United States Patent [19]
Personette

[11] Patent Number: 5,127,958
[45] Date of Patent: Jul. 7, 1992

[54] REMOVAL OF METALLIC COATINGS FROM POLYMERIC SUBSTRATES

[75] Inventor: David L. Personette, Slaughterville, Okla.

[73] Assignee: Morris Resources, Inc., Noble, Okla.

[21] Appl. No.: 698,477

[22] Filed: May 6, 1991

Related U.S. Application Data

[63] Continuation-in-part of Ser. No. 551,617, Jul. 11, 1990, abandoned.

[51] Int. Cl.$^5$ .......................... B08B 3/08; C11D 7/06; C11D 7/08; C23F 4/00
[52] U.S. Cl. .......................................... 134/2; 134/3; 134/10; 134/15; 134/22.17; 134/29; 252/135; 252/156
[58] Field of Search ...................... 134/2, 3, 22.17, 29, 134/10, 15; 252/135, 156

[56] References Cited

U.S. PATENT DOCUMENTS

| | | | |
|---|---|---|---|
| 3,099,584 | 7/1963 | Walsh | 134/9 |
| 3,553,144 | 1/1971 | Murphy | 252/156 |
| 4,392,889 | 7/1983 | Grout | 134/9 |
| 4,610,728 | 9/1986 | Natesh et al. | 134/29 |
| 4,612,057 | 9/1986 | Buser et al. | 134/29 |
| 4,799,954 | 1/1989 | Hochberg | 134/29 |

FOREIGN PATENT DOCUMENTS 066985 5/1979 Japan.
162986 9/1984 Japan.

Primary Examiner—Theodore Morris
Assistant Examiner—Zeinab El-Arini
Attorney, Agent, or Firm—Glen M. Burdick; Bill D. McCarthy

[57] ABSTRACT

A method for removing metallic coatings from polymeric substrates is provided. The method comprises contacting a metallic-coated polymeric substrate with an aqueous solution consisting essentially of from about 0.75 to about 11.25 weight percent trisodium phosphate and from about 0.75 to about 11.25 weight percent of an alkali metal hydroxide for a period of time effective to remove the metallic coating and produce a polymeric substrate substantially free of metal constituents and binder materials. The polymeric substrate and the metal constituents present in the metallic coating are recovered and reclaimed. A composition for removing the metallic coating from a metallic-coated polymeric substrate is also provided.

19 Claims, 1 Drawing Sheet

REMOVAL OF METALLIC COATINGS FROM POLYMERIC SUBSTRATES

CROSS-REFERENCE TO RELATED APPLICATION

This Application is a continuation in part of copending U.S. Pat. application Ser. No. 07/551,617 filed Jul. 11, 1990 now abandoned.

BACKGROUND OF THE INVENTION

1. Field of the Invention

The present invention relates generally to a method for removing metallic coatings from polymeric substrates, and more particularly but not by way of limitation, to a method for removing metallic coatings from polyester substrates such that substantially all of the metal constituents present in the coatings and the polyester substrates can be reclaimed and recycled.

2. Brief Description of the Prior Art

Magnetic tapes are widely used for storing large amounts of data generated by many computer systems because of the cost-effectiveness of such magnetic tapes. Accordingly, millions of pounds of magnetic tapes are produced each year; and because of the fragile nature of the magnetic tapes, the magnetic tapes are susceptible to damage by improper handling or through deterioration caused by movement of the magnetic tapes over the recording heads of the data storage units. Additionally, the processes involved in manufacturing magnetic tapes often result in overruns, endruns and defective tapes.

Heretofore, magnetic tapes have been disposed of in landfills. However, because magnetic tapes are generally metallic-coated polyester substrates and substantially nondegradable efforts are underway to prevent the industrial disposal of magnetic tapes in landfills.

Because of the nondegradable nature of magnetic tapes, a need exists for a method of disposing of magnetic tapes wherein the polymeric substrates, such as a polyester substrate, as well as the metal coatings on such substrates can be reclaimed and recycled and thereby eliminate the disposal problems inherent with magnetic tapes. However, such a method for reclaiming the substrate and metal coating of the magnetic tapes must not only be environmentally sound, but such a method must also provide a less hazardous, non-toxic work environment. It is to such a method that the present invention is directed.

SUMMARY OF THE INVENTION

The present invention relates to a method for removing metallic coatings from polymeric substrates. In one aspect, the present invention relates to an improved aqueous solution for use in the removal of metallic coatings, including binder material of the coatings, from polyester substrates whereby substantially all of the metal constituents present in the metallic coatings and the polymeric substrates, substantially free of the metallic coatings, can be reclaimed and recycled.

Broadly, the method for removing metallic coatings (including substantially all of the binder materials) from polyester substrates comprises contacting a metallic-coated polyester substrate with an aqueous solution consisting essentially of from about 0.75 to about 11.25 weight percent trisodium phosphate and from about 0.75 to about 11.25 weight percent of an alkali metal hydroxide for a period of time effective to remove the metallic coating and provide a substantially coating-free polyester substrate. The polyester substrate and the metal constituents present in the metal coating, once separated from the binder materials, can be reclaimed and recycled.

The conditions at which the aqueous solution is maintained in contact with the metallic-coated polyester substrate can very widely. However, desirable results have been obtained when the aqueous solution is maintained at a temperature of from about 160° F. to about 215° F. during contact with the metallic-coated polyester substrate; and wherein the metallic-coated polyester substrate is maintained in contact with the heated aqueous solution for a period of time of at least about 30 seconds, and more desirably from about 30 seconds to about one hour.

An object of the present invention is to provide an improved method for removing metallic coatings from polymeric substrates.

Another object of the present invention, while achieving the before stated object, is to provide an improved method for reclaiming a polyester substrate and metal constituents of a metallic coating of a metallic-coated polyester substrate which does not create hazardous work conditions for person practicing the method.

Other objects, advantages and features of the present invention will become apparent from the following detailed description of the drawing when read in conjunction with the appended claims.

DETAILED DESCRIPTION

Figure 1:
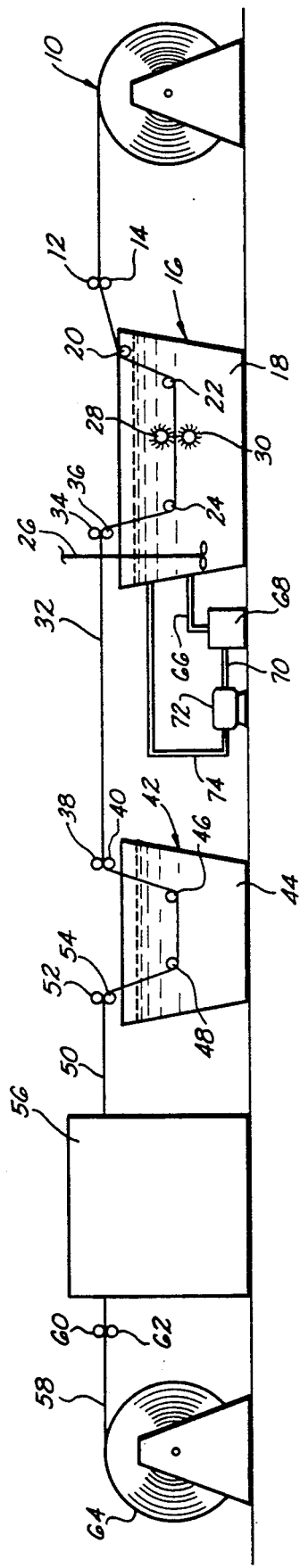
FIG. 1 is a schematic illustration of a method for removing a metallic coating from a roll of a metallic-coated polyester substrate in accordance with the present invention.

Metallic-coated polymeric substrates have found wide use, such as for magnetic tapes in the data processing industry, X-ray film and the like. Generally, the metallic constituents of the metallic coatings are secured to the surface of a polymeric substrate with a suitable binder material, such as polyvinyl dichloride. Such binder materials are well known to those skilled in the art. Thus, no further description or characterization of such binder materials are believed necessary to enable those skilled in the art to understand and practice the method of the present invention. Similarly, the metal constituents employed in the metallic coatings are well known to those skilled in the art, as is the selection of the metal constituent based upon the use use to the metallic coated substrates. Typical of the metal constituents employed in metallic coatings for polymeric substrates are ferric and ferrous oxide (hereinafter referred to as iron oxide), chromium dioxide, titanium dioxide, cobalt, silver and the like.

The present invention provides an improved method for removing metallic coating (i.e. the binder materials and the metal constituents) from polymeric substrates so that the polymeric substrate can be reclaimed and recycled, while at the same time separating the metal constituents from the binder materials so that the metal constituents of the metallic coating can also be recovered and reclaimed. While any polymeric substrate having a metallic coating can be utilized in the practice of the present invention, desirable results have been obtained wherein the polymeric substrate is a polyester substrate, such a polyethylene terephthalate polyester.

Broadly, the method for removing metallic coatings from polyester substrates comprises contacting the metallic-coated polyester substrate with an effective amount of an aqueous solution consisting essentially of from about 0.75 to about 11.25 weight percent trisodium phosphate and from about 0.75 to about 11.25 weight percent of an alkali metal hydroxide for a period of time effective to remove the metallic coating and produce a substantially coating-free polyester substrate. The term "coating-free" substrate as used herein is to be understood to mean a substrate which is substantially free of any materials employed in the metallic coating, i.e. the binder materials and the metallic constituents.

The mechanism involved in the removal of the metallic coating from the polyester substrate is not fully understood. However, it is believed that the combination of the trisodium phosphate and the alkali metal hydroxide breaks the adhesive bond of the binder materials of the metallic coatings so that the binder materials are removed from the substrate and the metallic constituents present in the metallic coatings are separated from the binder materials. Thus, the substrate and the metal constituents can be recovered and reclaimed.

In carrying out the method of the present invention, the metallic-coated polyester substrate is contacted with the before-described aqueous solution of trisodium phosphate and an alkali metal hydroxide for a period of time effective to insure that the metallic coating, including all binder materials, has been completely removed from the polyester substrate. The polyester substrate and the metal constituents present in the metallic coating (which are also separated from the binder material) can then be recovered and reclaimed. For example, when removing the metallic coating from X-ray film, the trisodium phosphate/alkali metal hydroxide solution removes substantially all of the binder materials in the metallic coating from the polyester substrate, including polyvinyl dichloride, as well as from the silver present in the metallic coating. Thus, substantially all of the silver originally present in the metallic coating of X-ray film can be recovered; and the polymeric substrate, which is substantially free of any binder materials, can also be reclaimed.

The period of time in which the metallic-coated polyester substrate is maintained in contact with the aqueous solution can vary, but will generally be for a period of at least about 30 seconds, and more desirably from about 30 seconds to about 60 minutes. Similarly, the temperature at which the aqueous solution is maintained during contact with the metallic-coated polyester substrate so as to enhance removal of the metallic coating from the polyester substrate can vary widely, but will generally be from about 160° F. to about 215° F.

The amount of trisodium phosphate and alkali metal hydroxide employed in the formulation of the aqueous solution can vary and will be dependent, to a large degree, upon the solubility of each of the constituents and the temperature of the aqueous solution. However, desirable results have been obtained when the aqueous solution contains equal amounts of the trisodium phosphate and the alkali metal hydroxide.

Any suitable alkali metal hydroxide can be employed in the formulation of the aqueous solution. However, desirable results have been obtained wherein the alkali metal hydroxide is selected from the group consisting of sodium hydroxide, potassium hydroxide and mixtures thereof.

Referring now to the drawings, and more particularly to FIG. 1, a continuous process for removing a metallic coating from a metallic-coated polyester substrate in accordance with the present invention will be described. A roll of metallic-coated substrate 10, such as a roll of magnetic tape, is fed through nip rollers 12, 14 into a treatment vessel 16 for contact with an aqueous solution 18 containing from about 0.75 to about 11.25 weight percent trisodium phosphate and from about 0.75 to about 11.25 weight percent of an alkali metal hydroxide. The metallic-coated substrate 10 is maintained in contact with the aqueous solution 18 for a period of time effective to remove the binder material, and thus the metallic constituents of the metallic coating, from the substrate.

In order to maintain the metallic-coated substrate 10 in contact with the aqueous solution 18 in the treatment vessel 16, the treatment vessel 16 is provided with a plurality of guide rollers, such as guide rollers, 20, 22 and 24. The treatment vessel 16 is also provided with a stirring mechanism or agitator 26 to agitate the aqueous solution 18. To enhance removal of the metallic coating (including the binder materials and the metal constituents of the metallic coating) from the metallic-coated substrate 10 during passage through the aqueous solution 18, the treatment vessel 16 may also be provided with brushes 28, 30 for abrading the surface of the metallic-coated substrate 10 so as to enhance removal of the metallic coating and produce a coating-free substrate.

After the metallic-coated substrate 10 has been in contact with the aqueous solution 18 for a period of time effective to remove the metallic coating from the metallic-coated substrate 10, a substantially coating-free substrate 32 is removed from the aqueous solution 18. Upon removal from the aqueous solution 18, the coating-free substrate 32 is passed through squeeze rollers 34, 36 to remove residual aqueous solution.

The coating-free substrate 32 is then passed from the treatment vessel 16 through guide rollers 38, 40 and into a rinse vessel 42 containing an aqueous rinse solution 44. To insure that the coating-free substrate 32 is maintained in contact with the aqueous rinse solution 44, the rinse vessel 42 is provided with a plurality of guide rollers, such as guide rollers 46, 48. A rinsed coating-free substrate 50 is then passed from the rinse vessel 42 through squeeze rollers 52, 54 to remove excess rinse solution; and the rinsed coating-free substrate 50 is then passed to a dryer 56 to dry the rinsed coating free substrate 50. Upon exiting the dryer 56, a dried coating free substrate 58 is directed through rollers, 60, 62 to a take-up roll 64.

In order to separate and recover the metallic constituents removed from the substrate, a fluid outlet conduit 66 is disposed in a lower portion of the treatment vessel 16, and the conduit 66 fluidly communicates with a liquid-solid separator 68. The liquid phase from the liquid-solid separator 68 is directed via a conduit 70 to a pump 72 which communicates with the treatment vessel 16 via a conduit 74. Thus, the aqueous solution containing suspended metal constituents withdrawn from the treatment vessel 16 via the fluid outlet conduit 66 is passed through the liquid-solid separator 68, the conduit 70, the pump 72 and the conduit 74 for recycling to the treatment vessel 16. The recycling of the aqueous solution 18, in addition to removing metal constituents, functions to provide additional agitation to the aqueous solution 18 in the treatment vessel 16.

The method for removing a metallic coating from a metallic coated polymeric substrate of the present invention can also be carried out in a batch operation, especially when the metallic-coated polyester substrate is in the form of sheets, such as X-ray film. Sheets or pieces of a metallic-coated polyester substrate are introduced into a treatment vessel for contact with the aqueous solution. The sheets of the metallic-coated polyester substrate are maintained in contact with the aqueous solution for a period of time effective to remove the metallic coating from the substrate.

In order to insure that that the sheets of the metallic-coated substrate are maintained in contact with the aqueous solution, the aqueous solution is stirred or agitated. Further, if desired, the sheets of the metallic-coated polyester substrate can be retained within baskets or tumblers positioned within the treatment vessel so as to enhance removal of the treated sheets of the polyester substrate once the metallic coating has been removed.

After the sheets of the metallic-coated substrate have been in contact with aqueous solution for a period of time effective to remove the metallic coating from the substrate, the substantially coating-free substrate is removed from the aqueous solution and introduced into the rinse vessel containing an aqueous rinse solution. If desired, the rinse vessel can be equipped with a suitable stirring mechanism or agitator to agitate the aqueous rinse solution to insure that residual aqueous solution on the coating-free polyester substrate is removed by the aqueous rinse solution.

A rinsed, coating-free substrate is then removed from the rinse vessel and dried in a conventional dryer. Upon removal from the dryer a dried coating-free substrate is recovered which can thereafter be reclaimed and recycled. If desired, one or more rinse vessels can be employed in series to insure that all of the aqueous solution has been removed from the coating-free substrate prior to drying.

The sheets of the coating-free substrate can also be dried chemically. For example, the sheets of the coating-free substrate can be dried with acetone and the like.

In order to more fully describe the inventive concept set forth herein, the following examples are given. However, the examples are merely illustrative in purpose and are not intended to be limiting upon the inventive concept as set forth in the appended claims.

EXAMPLE I

An aqueous solution containing 1.5 weight percent trisodium phosphate and 1.5 weight percent sodium hydroxide was heated to a temperature of from about 170° F. A polyethylene terephthalate polyester substrate having an iron oxide coating was contacted with the aqueous solution for about 30 minutes. At the end of the 30-minute contact period, the substrate was removed from the aqueous solution, rinsed with water and dried. Upon examination, it was determined that the polyethylene terephthalate polyester substrate was substantially free of any metal constituents and binder materials originally present in the coating. Further, upon subjecting the aqueous solution to filtration, the iron-oxide removed from the substrate was reclaimed.

EXAMPLE II

A series of experiments were conducted employing the aqueous solution and procedure of Example I except that the metallic constituent of the metallic-coated polyethylene terephthalate polyester substrate was chromium dioxide, titanium dioxide, cobalt or silver. In each instance, the polyethylene terephthalate polyester substrate recovered was substantially free of any metal constituents and binder materials originally present in the coating. Upon filtration of the aqueous solutions, the metal constituents originally present in the metallic coatings were readily recovered.

EXAMPLE III

An aqueous solution containing 1.0 weight percent trisodium phosphate and 1.0 weight percent sodium hydroxide was heated to a temperature of from about 170° F. Sheets of spent X-ray film, i.e. a polyethylene terephthalate polyester substrate having a silver containing coating, were contacted with the aqueous solution for about 30 minutes. At the end of the 30-minute contact period, the substrates were removed from the aqueous solution, rinsed with water and dried. Upon examination, it was determined that the polyethylene terephthalate polyester substrates were substantially free of any of the silver and binder materials originally present in the coating. Further, upon subjecting the aqueous solution to filtration the silver was recovered and thus reclaimed.

EXAMPLE IV

A series of experiments were conducted employing the aqueous solution and procedure of Example III except that the metallic constituents of the metallic-coated polyethylene terephthalate polyester substrates were chromium dioxide, titanium dioxide, cobalt or iron oxide. In each instance, the polyethylene terephthalate polyester substrate recovered was substantially free of any of the metal constituents and binder materials originally present in the coatings. Upon filtration of the aqueous solutions, the metal constituents were readily recovered.

The above examples clearly illustrate the method for removing metallic coatings from metallic-coated substrates in accordance with the invention wherein the metal constituents present in the metallic coating can be safely and economically recovered from a metallic-coated polyester substrate by contacting a metallic-coated polyester substrate with an aqueous solution consisting essentially of from about 0.75 to about 11.25 weight percent trisodium phosphate and from about 0.75 to about 11.25 weight percent of an alkali metal for a period of time effective to remove the metallic coating and thereby produce a substantially coating-free substrate. The coating-free substrate recovered can also be recovered and reclaimed.

From the foregoing description and examples, it is clear that the present invention is well adapted to carry out the objects and attain the ends and advantages as well as those inherent therein. While presently preferred embodiments of the invention have been described for purposes of this disclosure, numerous changes may be made which will readily suggest themselves to those skilled in the art, which changes are encompassed within the spirit of the invention disclosed and as defined in the appended claims.

What is claimed is:

1. A method for removing metallic coatings from polymeric substrates so that metal constituents present in the coating and a substantially coating-free substrate can be recovered, said metallic coating comprises: metals or metal oxides selected from the group consisting essentially of iron oxide, chromium dioxide, titanium dioxide, cobalt and silver the method comprising:

introducing a metallic-coated polymeric substrate into a treatment vessel containing an aqueous solution consisting essentially of from about 0.75 to about 11.25 weight percent trisodium phosphate and from about 0.75 to about 11.25 weight percent of an alkali metal hydroxide for a period of time effective to remove the metallic coating; and recovering from the treatment vessel separated metallic constituents and the coating-free polymeric substrate.

2. The method of claim 1 further comprising removing residual aqueous solution from the coating-free polymeric substrate.

3. The method of claim 1 wherein the aqueous solution is maintained at a temperature of from about 160° F. to about 215° F.

4. The method of claim 3 wherein the period of time effective to remove the metallic coating and produce the coating-free polymeric substrate is at least about 30 seconds.

5. The method of claim 4 wherein the polymeric substrate is polyethylene terephthalate polyester and wherein the alkali metal hydroxide is selected from the group consisting of sodium hydroxide, potassium hydroxide and mixtures thereof.

6. The method of claim 1 further comprising abrading the metallic-coated polymeric substrate while in contact with the aqueous solution to enhance removal of the metallic coating.

7. The method of claim 1 further comprising:
removing residual aqueous solution from the coating-free polymeric substrate;
rinsing the coating-free polymeric substrate; and
drying the rinsed, coating-free polymeric substrate.

8. The method of claim 1 further comprising agitating the aqueous solution during contact with the metallic-coated polymeric substrate to enhance contact there between.

9. The method of claim 1 further comprising:
passing at least a portion of the aqueous solution containing suspended metal constituents through a liquid-solid separator to separate and recover metal constituents from the aqueous solution.

10. A method for removing metallic coatings from a polymeric substrate, said metallic coating comprises: metals or metal oxides selected from the group consisting essentially of iron oxide, chromium dioxide, titanium dioxide, cobalt and silver, comprising:

contacting a metallic-coated polymeric substrate with an aqueous solution consisting essentially of from about 0.75 to about 11.25 weight percent trisodium phosphate and from about 0.75 to about 11.25 weight percent of an alkali metal hydroxide in a treatment vessel for a period of time effective to remove the metallic coating and provide a coating-free polymeric substrate substantially free of metal constituents and binder materials, the aqueous solution being maintained at a temperature of from about 160° F. to about 215° F.;

rinsing the coating-free polymeric substrate to remove residual aqueous solution therefrom; and
drying the rinsed, coating-free polymeric substrate to provide a dried coating-free polymeric substrate.

11. The method of claim 10 further comprising:
removing excess aqueous solution from the coating-free polymeric substrate prior to rinsing same.

12. The method of claim 10 further comprising:
withdrawing at least a portion of the aqueous solution from the treatment vessel;
passing the withdrawn portion of the aqueous solution through a liquid-solid separator to form a separated liquid phase and a separated solid phase consisting of the metal constituents present in the metallic coating;
recycling the separated liquid phase to the treatment vessel;
recovering the separated solid phase.

13. The method of claim 10 wherein the period of time effective to remove the metallic coating is at least about 30 seconds.

14. The method of claim 10 further comprising agitating the aqueous solution in the treatment vessel during contact of the metallic-coating polymeric substrate.

15. The method of claim 14 wherein the period of time effective to remove the metallic coating is from about 30 seconds to about 60 minutes.

16. The method of claim 15 further comprising:
withdrawing at least a portion of the aqueous solution from the treatment vessel;
passing the withdrawn portion of the aqueous solution through a liquid-solid separator to form a separated liquid phase and a separated solid phase;
recycling the separated liquid phase to the treatment vessel; and
recovering metal constituents from the separated solid phase.

17. The method of claim 10 further comprising abrading the surface of the metallic coated polymeric substrate during contact with aqueous solution in the treatment vessel to enhance removal of the metallic coating therefrom.

18. An aqueous composition for removing a metallic coating from a metallic-coated polymeric substrate so as to provide a polymeric substrate substantially free of metal constituents and binder materials present in the metallic coating, said metallic coating comprises: metals or metal oxides selected from the group consisting essentially of iron oxide, chromium dioxide, titanium dioxide, cobalt and silver, the aqueous composition consisting essentially of from about 0.75 to about 11.25 weight percent trisodium phosphate and from about 0.75 to about 11.25 weight percent of an alkali metal hydroxide.

19. The composition of claim 18 wherein the alkali metal hydroxide is selected from the group consisting of sodium hydroxide, potassium hydroxide and mixtures thereof.

* * * * *